United States Patent
Agazzi

(10) Patent No.: US 8,270,323 B2
(45) Date of Patent: *Sep. 18, 2012

(54) APPARATUS FOR, AND METHOD OF, REDUCING NOISE IN A COMMUNICATIONS SYSTEM

(75) Inventor: Oscar E. Agazzi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/698,213

(22) Filed: Feb. 2, 2010

(65) Prior Publication Data

US 2010/0202576 A1  Aug. 12, 2010

Related U.S. Application Data

(63) Continuation of application No. 11/350,439, filed on Feb. 9, 2006, now Pat. No. 7,656,827, which is a continuation of application No. 10/234,401, filed on Sep. 4, 2002, now Pat. No. 7,020,099, which is a continuation of application No. 09/801,235, filed on Mar. 7, 2001, now Pat. No. 6,463,041, which is a continuation of application No. 09/037,328, filed on Mar. 9, 1998, now Pat. No. 6,236,645.

(51) Int. Cl.
*H04B 3/20* (2006.01)
(52) U.S. Cl. ....................................................... 370/286
(58) Field of Classification Search .................. 370/201, 370/278; 379/417; 455/24, 63.1–65, 135, 455/222–224, 278.1, 283–288, 296–312, 455/501–506
See application file for complete search history.

(56) References Cited

U.S. PATENT DOCUMENTS

| 5,659,609 A | 8/1997 | Koizumi et al. |
| 5,812,537 A | 9/1998 | Betts et al. |
| 6,236,645 B1 | 5/2001 | Agazzi |
| 6,463,041 B1 | 10/2002 | Agazzi |

*Primary Examiner* — Gary Mui
(74) *Attorney, Agent, or Firm* — Thomas, Kayden, Horstemeyer & Risley, LLP

(57) ABSTRACT

A communication line having a plurality of twisted wire pairs connects a plurality of transmitters, one transmitter at each end of each twisted wire pair, with a plurality of receivers, one receiver at each end of each twisted wire pair. Each receiver receives a combination signal including a direct signal from the transmitter at the opposite end of the twisted wire pair with which the receiver is associated and a plurality of far-end crosstalk (FEXT) impairment signals, one from each of the remaining transmitters at the opposite end of the communications line. A plurality of FEXT cancellation systems, one associated with each receiver, provides a replica FEXT impairment signal. A device associated with each receiver is responsive to the combination signal received by the receiver and the replica FEXT impairment signal provided by the FEXT cancellation system associated with the receiver for substantially removing the FEXT impairment signals from the combination signal. If necessary, a skew adjuster delays the arrival of the combination signal at the device so that the combination signal and the FEXT impairment signal arrive at the device at substantially the same time. A sequential decoder operates on signals from each of the plurality of wire pairs simultaneously to produce receiver outputs. A plurality of near-end crosstalk (NEXT) cancellation systems and echo cancellers remove NEXT and echo impairment signals from the combination signal.

48 Claims, 14 Drawing Sheets

FIG_7

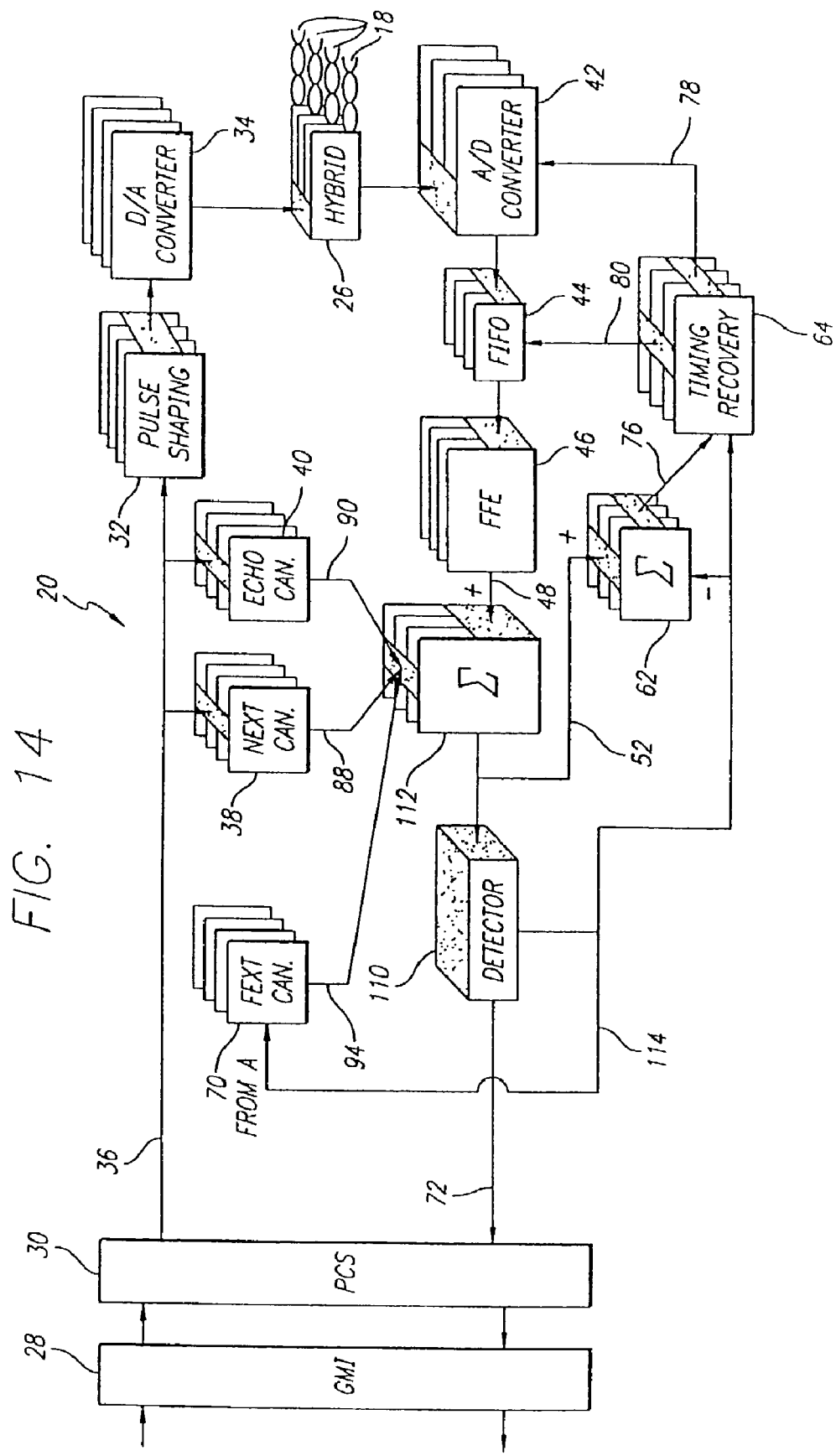

APPARATUS FOR, AND METHOD OF, REDUCING NOISE IN A COMMUNICATIONS SYSTEM

CROSS-REFERENCE TO RELATED APPLICATIONS

This application is a continuation of U.S. application Ser. No. 11/350,439, filed Feb. 9, 2006, now U.S. Pat. No. 7,656,827, which is a continuation of U.S. application Ser. No. 10/234,401, filed Sep. 4, 2002, now U.S. Pat. No. 7,020,099, issued Mar. 28, 2006, which is a continuation of U.S. application Ser. No. 09/801,235, filed Mar. 7, 2001, now U.S. Pat. No. 6,463,041, issued Oct. 8, 2002 which is a continuation of U.S. application Ser. No. 09/037,328, filed Mar. 9, 1998, now U.S. Pat. No. 6,236,645, issued May 22, 2001. The above applications are each incorporated herein by reference in their entirety.

BACKGROUND OF THE INVENTION

1. Field of the Invention

This invention relates to systems for, and methods of, providing for the transmission and reception of signals through unshielded twisted pairs of wires within a communications system. The invention particularly relates to systems for, and methods of, reducing the noise present in the signals received and processed by devices within a communications system and to systems for, and methods of, reducing such noise in communications systems having high throughputs. A "high throughput" as used within the context of this disclosure may include, but is not limited to, one gigabit (GB) per second.

2. Description of Related Art

A basic communications system is illustrated in FIG. 1. The system includes a hub and a plurality of computers serviced by the hub in a local area network (LAN). Four computers are shown by way of illustration but a different number of computers may be contained within the system. Each of the computers is usually displaced from the hub by a distance which may be as great as approximately one hundred meters (100 m.). The computers are also displaced from each other. The hub is connected to each of the computers by a communications line. Each communication line includes unshielded twisted pairs of wires or cables. Generally, the wires or cables are formed from copper. Four unshielded twisted pairs of wires are provided in each communication line between each computer and the hub. The system shown in FIG. 1 is operative with several categories of unshielded twisted pairs of cables designated as categories 3, 4 and 5 in the telecommunications industry. Category 3 cables are the poorest quality (and lowest cost) and category 5 cables are the best quality (and highest cost).

Associated with each communications system is a "throughput". The throughput of a system is the rate at which the system processes data and is usually expressed in bits/second. Most communications systems have throughputs of 10 megabits (Mb)/second or 100 Mb/second. A rapidly evolving area of communications system technology enables 1 Gb/second full-duplex communication over existing category-5 unshielded twisted pair cables. Such a system is commonly referred to as "Gigabit Ethernet."

A portion of a typical Gigabit Ethernet is shown in FIG. 2. The Gigabit Ethernet provides for transmission of digital signals between one of the computers and the hub and the reception of such signals at the other of the computer and the hub. A similar system can be provided for each of the computers The system includes a gigabit medium independent interface (GMII) block which receives data in byte-wide format at a specified rate, for example 125 MHz, and passes the data onto the physical coding sublayer (PCS) which performs scrambling, coding, and a variety of control functions. The PCS encodes bits from the GMII into 5-level pulse amplitude modulation (PAM) signals. The five signal levels are $-2$, $-1$, $0$, $+1$, and $+2$. Communication between the computer and hub is achieved using four unshielded twisted pairs of wires or cables, each operating at 250 Mb/second, and eight transceivers, one positioned at each end of a unshielded twisted pair. The necessity of full-duplex bidirectional operation dictates the use of hybrid circuits at the two ends of each unshielded twisted pair. The hybrid controls access to the communication line, thereby allowing for full-duplex bidirectional operation between the transceivers at each end of the communications line.

A common problem associated with communications systems employing multiple unshielded twisted pairs and multiple transceivers is the introduction of crosstalk and echo noise or impairment signals into the transmission signals. Noise is inherent in all such communications systems regardless of the system throughput. However, the effects of these impairment signals are magnified in Gigabit Ethernet. Impairment signals include echo, near-end crosstalk (NEXT), and far-end crosstalk (FEXT) signals. As a result of these impairment signals the performance of the transceivers, particularly the receiver portion, is degraded.

NEXT is an impairment signal that results from capacitive coupling of the signals from the near-end transmitters to the input of the receivers. The NEXT impairment signals encountered by the receiver in transceiver A are shown in FIG. 3. The crosstalk signals from transmitters B, C, and D appears as noise to receiver A, which is attempting to detect the direct signal from transmitter E. Each of the receivers in the system encounter the same effect and accordingly the signals passing through the receivers experience signal distortion due to NEXT impairment signals. For clarity of FIG. 3, only the NEXT impairment experienced by receiver A is illustrated.

Similarly, because of the bidirectional nature of the communications systems, an echo impairment signal is produced by each transmitter on the receiver contained within the same transceiver as the transmitter. The echo impairment signal encountered by the receiver in each transceiver is shown in FIG. 4. The crosstalk signals from transmitters appear as noise to the receivers, which are attempting to detect the signal from the transmitter at the opposite end of the communications line. Each of the receivers in the system encounter the same effect and accordingly the signals passing through the receivers experience signal distortion due to the echo impairment signal.

Far-end crosstalk (FEXT) is an impairment that results from capacitive coupling of the signal from the far-end transmitters to the input of the receivers. The FEXT impairment signals encountered by the receiver in transceiver A are shown in FIG. 5. The crosstalk signals from transmitters F, G, and H appears as noise to receiver A, which is attempting to detect the direct signal from transmitter E. Each of the receivers in the system encounter the same effect and accordingly the signals passing through the receivers experience signal distortion due to the FEXT impairment signal. For clarity of FIG. 5 only the FEXT impairment experienced by receiver A is illustrated.

As a result of these noise impairment signals the performance of the communication system is degraded. The signals carried by the system are distorted and the system experiences a higher signal error rate. Thus there exists a need in the art to provide a method of, and an apparatus for, compensating for the degradation of communication system performance caused by noise impairment signals and to provide a method of, and apparatus for, reducing such noise in a high throughput system such a Gigabit Ethernet. The present invention fulfills these needs.

SUMMARY OF THE INVENTION

Briefly, and in general terms, the invention relates to systems for, and methods of, reducing the noise present in the signals received and processed by devices within a communications system and to systems for, and methods of, reducing such noise in communications systems having high throughputs.

In one embodiment, the invention is a communications system including a communication line having a plurality of twisted wire pairs and a plurality of transmitters, one transmitter at each end of each twisted wire pair. The system also includes a plurality of receivers, one receiver at each end of each twisted wire pair. Each receiver receives a combination signal including a direct signal from the transmitter at the opposite end of the twisted wire pair with which the receiver is associated and a plurality of far-end crosstalk (FEXT) impairment signals, one from each of the remaining transmitters at the opposite end of the communications line. Further included in the system are a plurality of FEXT cancellation systems, one associated with each receiver; each FEXT cancellation system provides a replica FEXT impairment signal. The system also includes a plurality of devices, one associated with each receiver; each device is responsive to the combination signal received by the receiver and the replica FEXT impairment signal provided by the FEXT cancellation system associated with the receiver for substantially removing the FEXT impairment signals from the combination signal.

By providing a plurality of FEXT cancellation devices which generate replica FEXT impairment signals and a plurality of devices which combine the replica FEXT impairment signals with the combination signals, the invention substantially cancels the FEXT impairment signals from the combination signal. Thus signal degradation due to noise in the communications system is reduced and the transmitted information may be more reliably recovered.

In another embodiment, the invention is a method for reducing noise in a communications system. The communications system comprises a communication line having a plurality of twisted wire pairs, a plurality of transmitters, one transmitter at each end of each of the twisted wire pairs, a plurality of receivers, one receiver at each end of each of the twisted wire pairs. Each receiver receives a combination signal including a direct signal from the transmitter at the opposite end of the twisted wire pair with which the receiver is associated and a plurality of far-end crosstalk (FEXT) impairment signals, one from each of the remaining transmitters at the opposite end of the communications line. The communications system further comprises a plurality of combining devices, one associated with each receiver. The method comprises the step of generating a replica FEXT impairment signal. Also included is the step of delaying the arrival of the combination signal, at the combining device, by an amount substantially equal to the time delay between the arrival, at the receiver, of the direct signal and the FEXT impairment signals. Further included is the step of subtracting the replica FEXT impairment signal from the combination signal to produce an output signal substantially devoid of FEXT impairment signals.

In yet another embodiment, the invention is a system comprising a communication line having a plurality of twisted wire pairs and having a transmitter and a receiver connected at each end of each twisted wire pair to transmit and receive sequences of signals. The system also includes a decoder responsive to the sequences of the signals from the receivers at the same ends of the twisted wire pairs for determining whether such sequences of signals are acceptable and for processing such sequences of signals in accordance with such determinations.

In an additional facet of this embodiment of the invention the decoder determines whether the sequences of the signals at the receivers are acceptable or unacceptable based on a standard system code. The code introduces constraints in the sequences of symbols that can be transmitted in such a way as to increase the minimum distance between two arbitrary allowable sequences. This increased minimum distance results in a reduced probability of error. The decoder passes acceptable sequences of signals and rejects unacceptable sequences. Acceptable sequences are those sequences which obey the code constraints while unacceptable sequences are those which violate the code constraints.

These and other aspects and advantages of the present invention will become apparent from the following more detailed description, when taken in conjunction with the accompanying drawings which illustrate, by way of example, the preferred embodiments of the invention.

BRIEF DESCRIPTION OF THE DRAWINGS

FIG. 14 is a schematic block diagram of a communications system in accordance with one embodiment of the present invention including a plurality of transceivers, each having a NEXT cancellation system, an echo canceller, a FEXT cancellation system, a digital adaptive filter system including one detector, and a timing recovery circuit.

DETAILED DESCRIPTION OF THE PREFERRED EMBODIMENTS

The discussion in this specification may be considered to relate specifically to a Gigabit Ethernet for the purposes of explanation and understanding of the invention. However, it will be understood that the concepts of this invention and the scope of the claims apply to other types of communications systems other than a Gigabit Ethernet.

Figure 1:
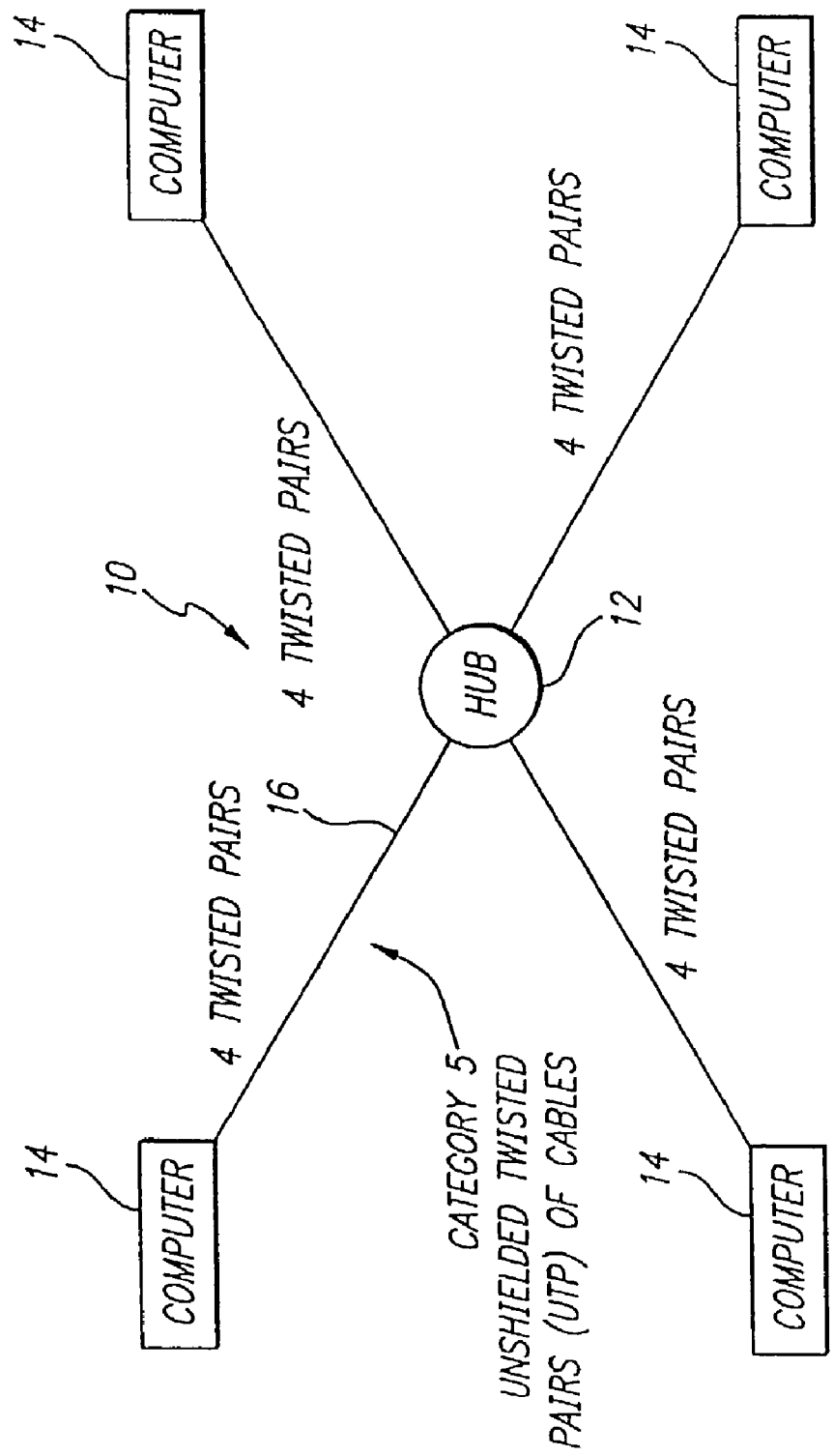
FIG. 1 is a schematic block diagram of a communications system providing a plurality of computers connected to a hub by communications lines to form a local area network (LAN)

A communications system incorporating the features of this invention is generally indicated at 10 in FIG. 1. The system 10 includes a hub 12 and a plurality of computers serviced by the hub in a local area network (LAN). Four computers 14 are shown by way of illustration but a different number of computers may be used without departing from the scope of the invention. Each of the computers 14 may be displaced from the hub 12 by a distance as great as approximately one hundred meters (100 m.). The computers 14 are also displaced from each other.

The hub 12 is connected to each of the computers 14 by a communications line 16. The communication line 16 comprises a plurality of unshielded twisted pairs of wires or cables. Generally, the wires or cables are formed from copper. Four unshielded twisted pairs of wires are provided in the system 10 between each computer and the hub 12. The system shown in FIG. 1 is operative with several categories of twisted pairs of cables designated as categories 3, 4 and 5 in the telecommunications industry. Category 3 cables are the poorest quality (and lowest cost) and category 5 cables are the best quality (and highest cost). Gigabit Ethernet uses category 5 cables.

Figure 2:
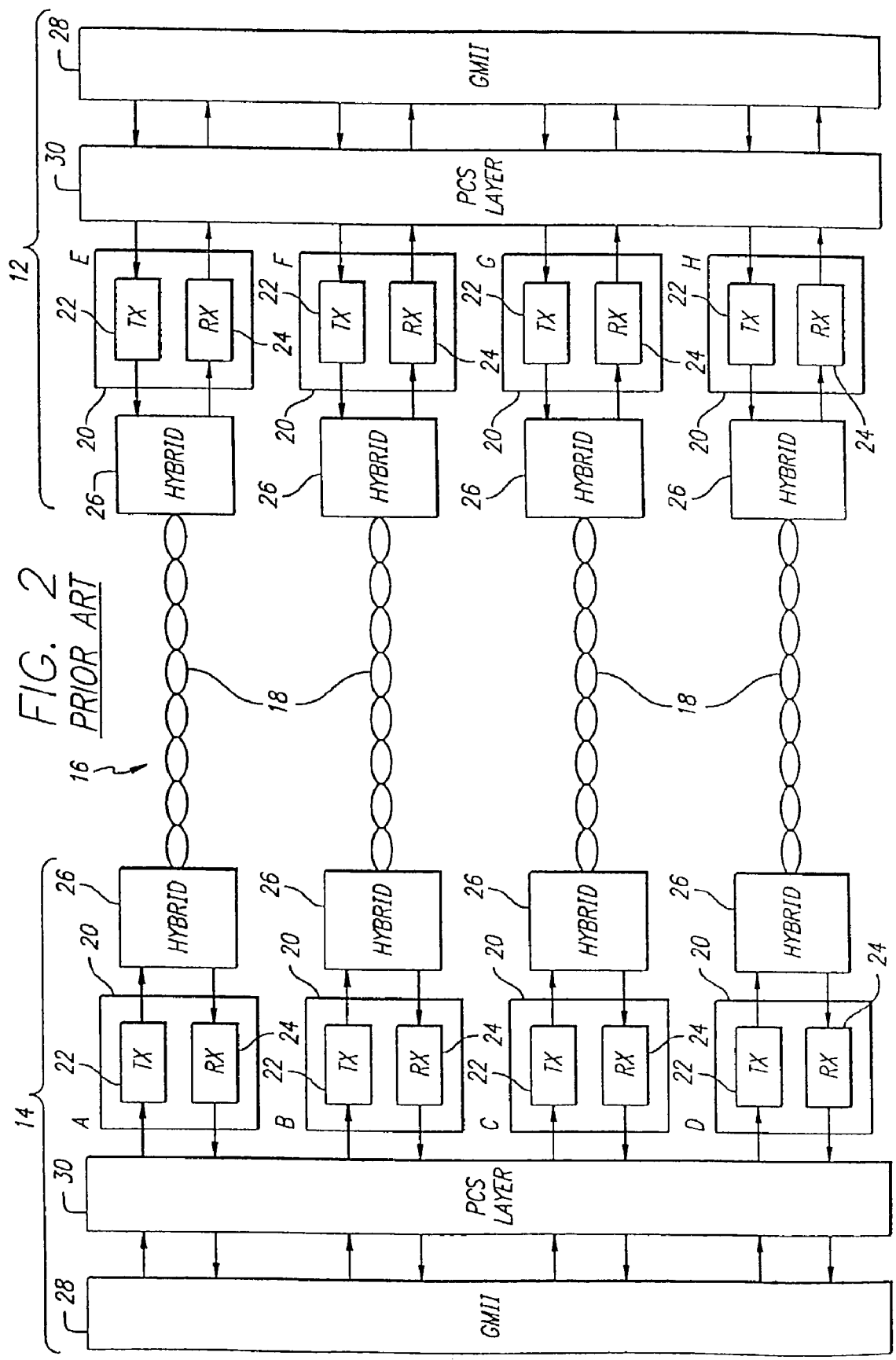
FIG. 2 is a schematic block diagram of a communications system providing a gigabit medium independent interface (GMII), a physical coding sublayer (PCS) and a plurality of unshielded twisted pairs of wires, each with a transceiver at each end.
Figure 3:
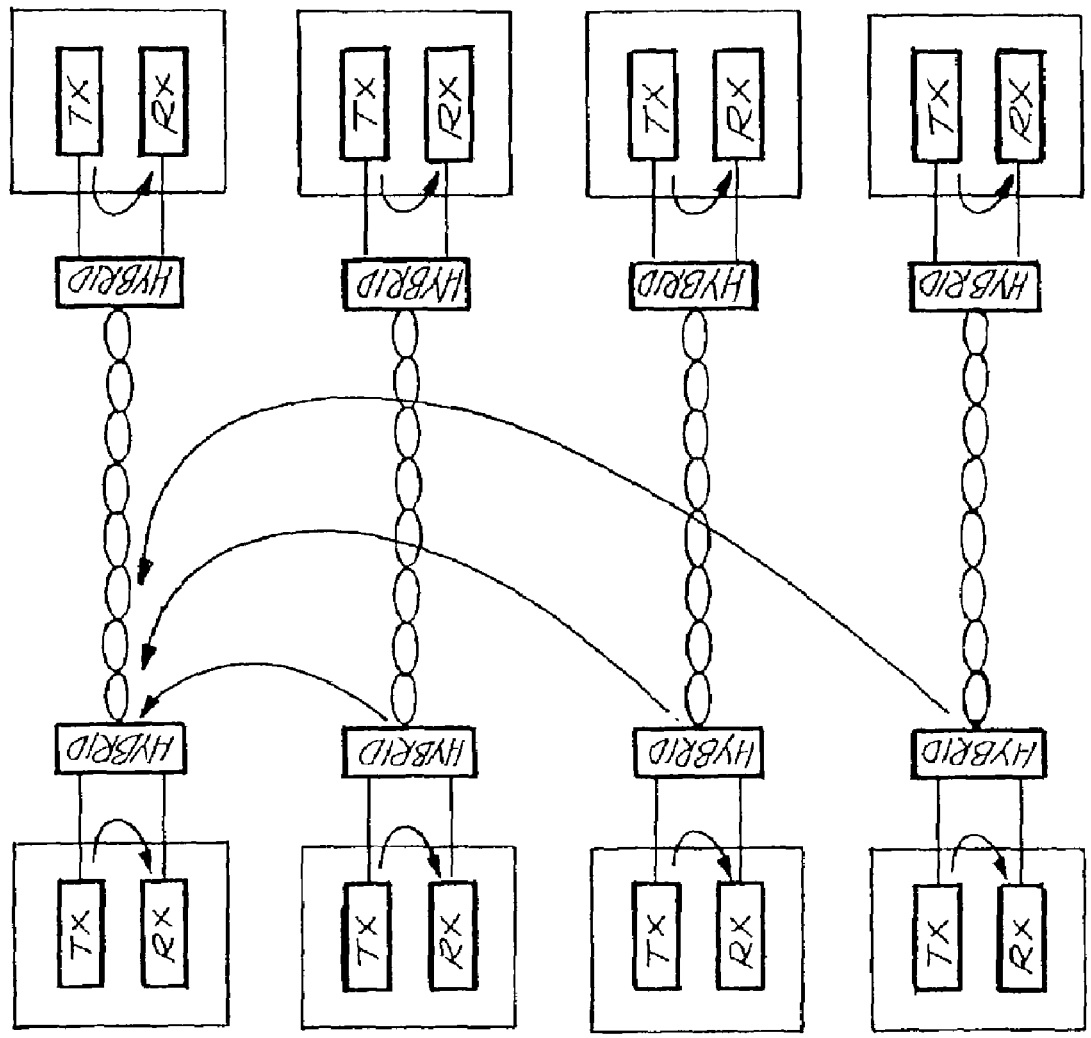
FIG. 3 is a schematic block diagram of a portion of the communications system of FIG. 2 depicting the NEXT impairment signals received by receiver A from adjacent transmitters B, C, and D.
Figure 4:
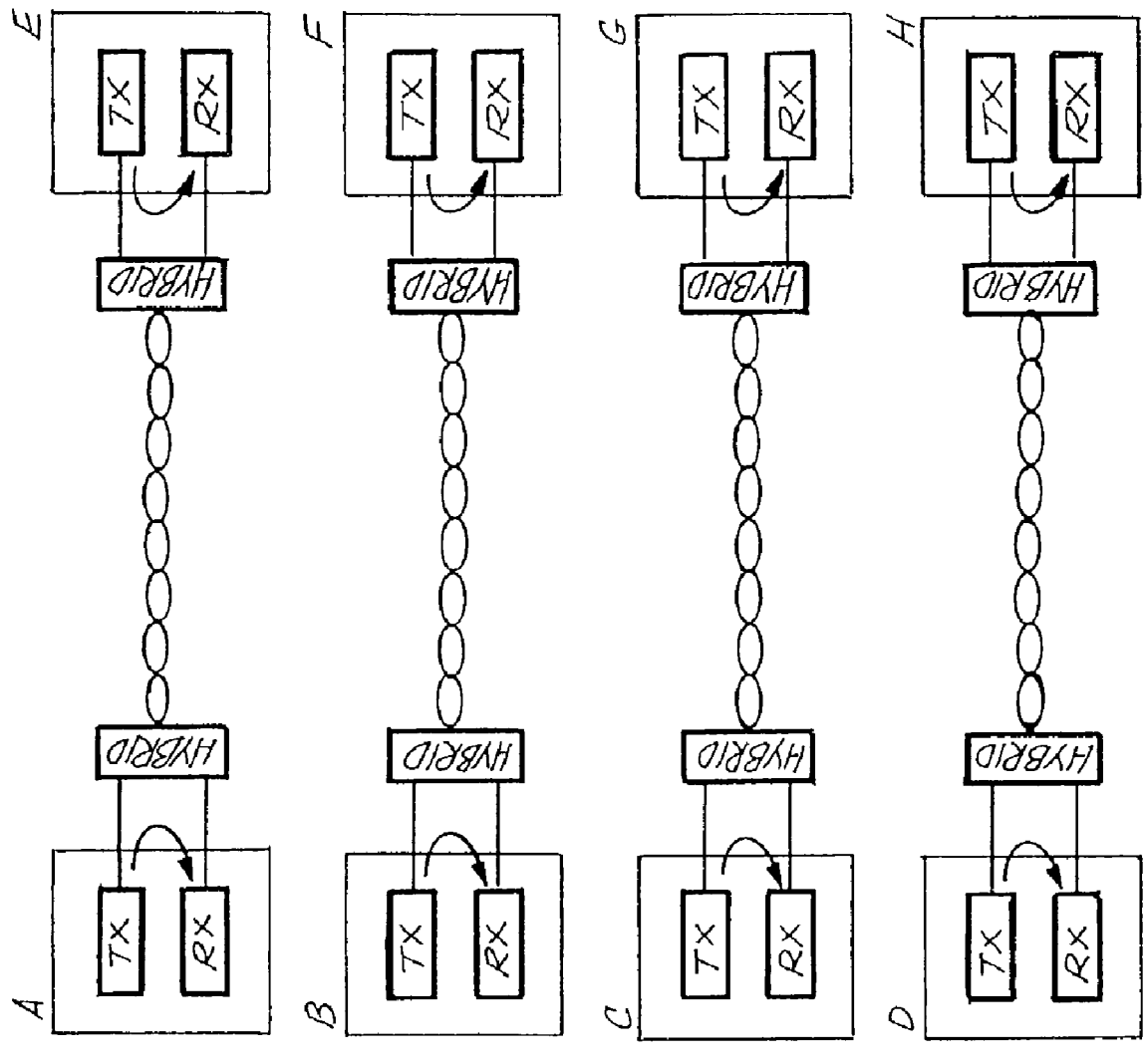
FIG. 4 is a schematic block diagram of a portion of the communications system of FIG. 2 depicting the echo impairment signal received by receiver A from transmitter A.

FIG. 2 illustrates, in detail, a portion of the communications system of FIG. 1 including one communications line 16 and portions of one of the computers 14 and the hub 12. The communications line 16 includes four unshielded twisted pairs of wires 18 operating at 250 Mb/second per pair. A transceiver 20, including a transmitter (TX) 22 and receiver (RX) 24, is positioned at each unshielded end of each twisted pair 18. Between each transceiver 20 and its associated unshielded twisted pair 18 is a hybrid 26. The hybrid 26 controls access to the communication line 16, thereby allowing for full-duplex bidirectional operation between the transceivers 20 at each end of the communications line. The hybrid also functions to isolate the transmitter and receiver associated with the transceiver, from each other.

The communications system includes a standard connector designated as a gigabit media independent interface (GMII). The GMII may be an eight bit wide data path in both the transmit and receive directions. Clocked at a suitable frequency, such as 125 MHz, the GMII results in a net throughput in both directions of data at a suitable rate such as 250 Mb/second per pair. The GMII provides a symmetrical interface in both the transmit and receive directions. A physical coding sublayer (PCS) 30 receives and transmits data between the GMII 28 and the transceivers 20. The PCS 30 performs such functions as scrambling and encoding/decoding data before forwarding the data to either the transceiver or the GMII. The PCS encodes bits from the GMII into 5-level pulse amplitude modulation (PAM) signals. The five signal levels are −2, −1, 0, +1, and +2. The PCS also controls several functions of the transceivers, such as skew control as explained below.

Figure 6:
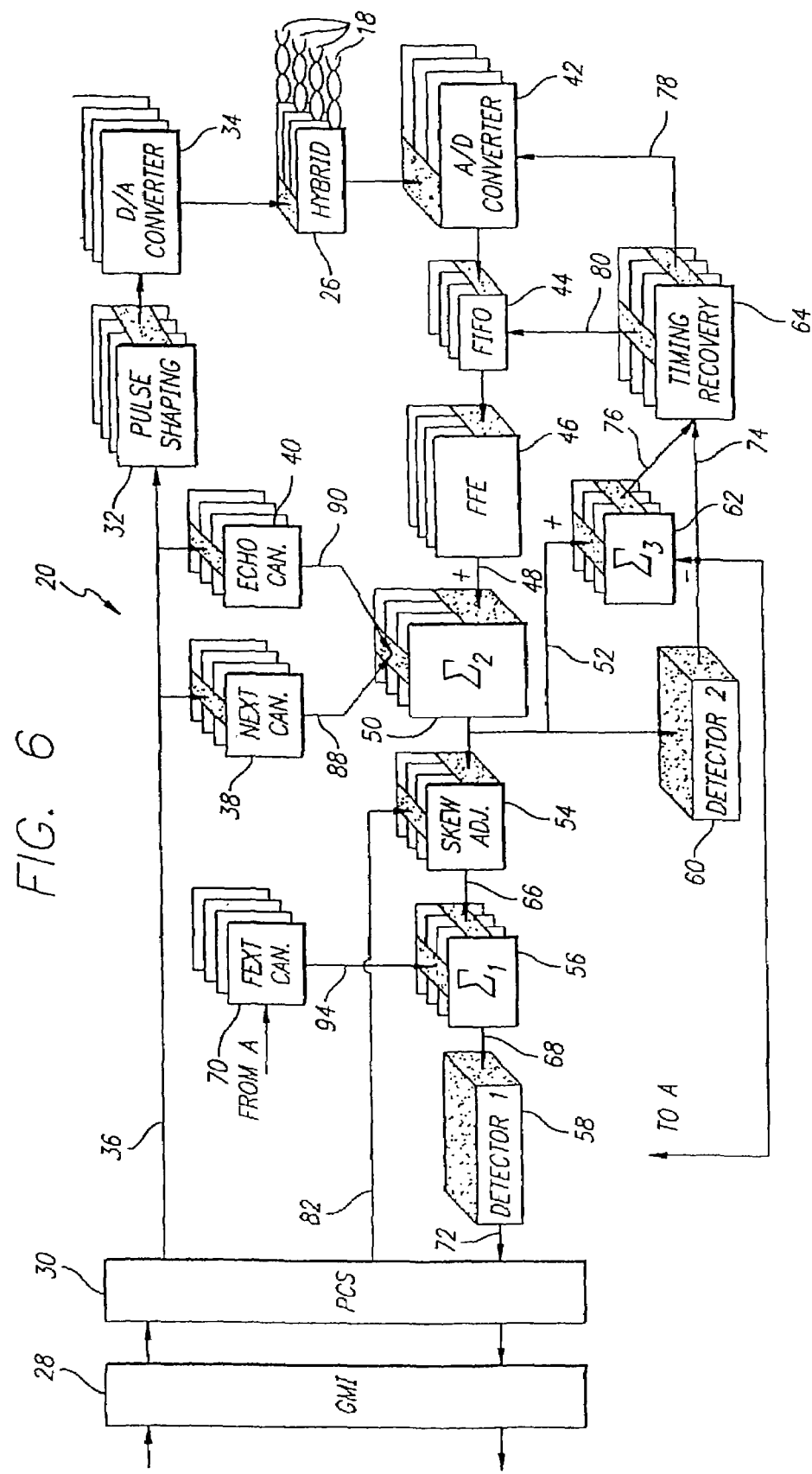
FIG. 6 is a schematic block diagram of a communications system in accordance with one embodiment of the present invention including a plurality of transceivers each having a NEXT cancellation system, an echo canceller, a FEXT cancellation system, a digital adaptive filter system including a plurality of detectors and a skew adjuster, and a timing recovery circuit.

Four of the transceivers 20 are illustrated in detail in FIG. 6. The components of the transceivers 20 are shown as overlapping blocks, with each layer corresponding to one of the transceivers. The GMII 28, PCS 30, and hybrid 26 of FIG. 6 correspond to the GMII, PCS, and hybrid of FIG. 2 and are considered to be separate from the transceiver. The combination of the transceiver 20 and hybrid 26 forms one "channel" of the communications system. Accordingly, FIG. 6 illustrates four channels, each of which operate in a similar manner. The transmitter portion of each transceiver 20 includes a pulse shaping filter 32 and a digital to analog (D/A) converter 34. In a preferred embodiment of the invention the D/A converter 34 operates at 125 MHz. The pulse shaping filter 32 receives one one-dimensional (1-D) symbol from the PCS. This symbol is referred to as a TXDatax symbol 36, where x is 1 through 4 corresponding to each of the four channels. The TXDatax symbol 36 represents 2 bits of data. The PCS generates one 1-D symbol for each of the channels. The symbol for each channel goes through a spectrum shaping filter of the form $0.75+0.25\ z^{-1}$ at the pulse shaping filter 32 to limit emissions within FCC requirements. This simple filter shapes the spectrum at the output of the transmitter so that its power spectral density falls under that of communications systems operating at 100 Mb/second on two pairs of category-5 twisted pair wires. The symbol is then converted into an analog signal by the D/A converter 34 which also acts as a lowpass filter. The analog signal gains access to the unshielded twisted pair wire 18 through the hybrid circuitry 26.

The receiver portion of each transceiver includes an A/D converter 42, a FIFO 44, a digital adaptive equalizer system, a timing recovery circuit and noise reduction circuitry. The digital adaptive equalizer system includes a feed-forward equalizer (FFE) 46, two devices 50, 56, a skew adjuster 54 and two detectors 58, 60. The functions of these components, as related to the present invention, are explained below. The general concept of the use of a digital adaptive equalizer in a communications system is disclosed in U.S. Pat. No. 5,604, 741 to Samueli et al. entitled ETHERNET SYSTEM. The noise reduction circuitry includes a NEXT cancellation system 38, an echo canceller 40, and a FEXT cancellation system 70.

The A/D converter 42 provides digital conversions of the signals received from the hybrid 26 at a suitable frequency, such as 125 MHz, which is equal to the baud rate of the signals. The A/D converter 42 samples the analog signals in accordance with an analog sample clock signal 78 provided by the decision-directed timing recovery circuit 64. The FIFO 44 receives the digital conversion signals from the A/D converter 42 and stores them on a first-in-first-out basis. The FIFO forwards individual signals to the FFE 46 in accordance with a digital sample clock signal 80 provided by the timing recovery circuit 64. The feed forward equalizer (FFE) 46 receives digital signals from the FIFO and filters these signals. The FFE 46 is a least mean squares (LMS) type adaptive filter which performs channel equalization and precursor inter symbol interference (ISI) cancellation to correct for distortions in the signal.

It should be noted that the signal introduced into the A/D converter 42 and subsequently into the FIFO 44 and FFE 46 has several components. These components include the direct signal received directly from the transmitter 22 at the opposite end of the unshielded twisted pair wire 18 with which the receiver 24 is associated. Also included are one or more of the NEXT, echo, and FEXT impairment signals from other transmitters 22 as previously described. The signal including the direct signal and one or more of the impairment signals is referred to as a "combination signal."

The FFE 46 forwards the combination signal 48 to a second device 50, typically a summing device. At the second device 50 the combination signal 48 is combined with the outputs of the NEXT cancellation system 38 and echo canceller 40 to produce a signal which is substantially devoid of NEXT and echo impairment signals. This signal is referred to as a "first soft decision" 52. The skew adjuster 54 receives the first soft decision 52 from the second device 50 and outputs a signal referred to as a "second soft decision" 66". The skew adjuster 54 performs two functions. First, it compensates for the difference in length of the unshielded twisted pairs 18 by delaying the first soft decision 52 so that the second soft decisions 66 from all of the receivers in the system are in sync. Second, it adjusts the delay of the first soft decision 52 so that the second soft decision 66 arrives at the first device 56 at substantially the same time as the output of the FEXT cancellation system 70. The skew adjuster 54 receives skew control signals 82 from the PCS 30.

The skew adjuster 54 forwards the second soft decision 66 to a first device 56, typically a summing device. At the first device 56 the second soft decision 66 is combined with the output of the FEXT cancellation system 70 to produce a signal which is substantially devoid of FEXT impairment signals. This signal is referred to as a "third soft decision" 68. The first detector 58 receives the third soft decision 68 from the first device 56. The first detector 58 provides an output signal, i.e., a "final decision" 72. The detector may be a slicer which produces a final decision 72 corresponding to the analog signal level closest in magnitude to the level of the third soft decision 68. The detector may also be either a symbol-by-symbol detector or a sequential detector which operates on sequences of signals across all four channels simultaneously, such as a Viterbi decoder.

Figure 7:
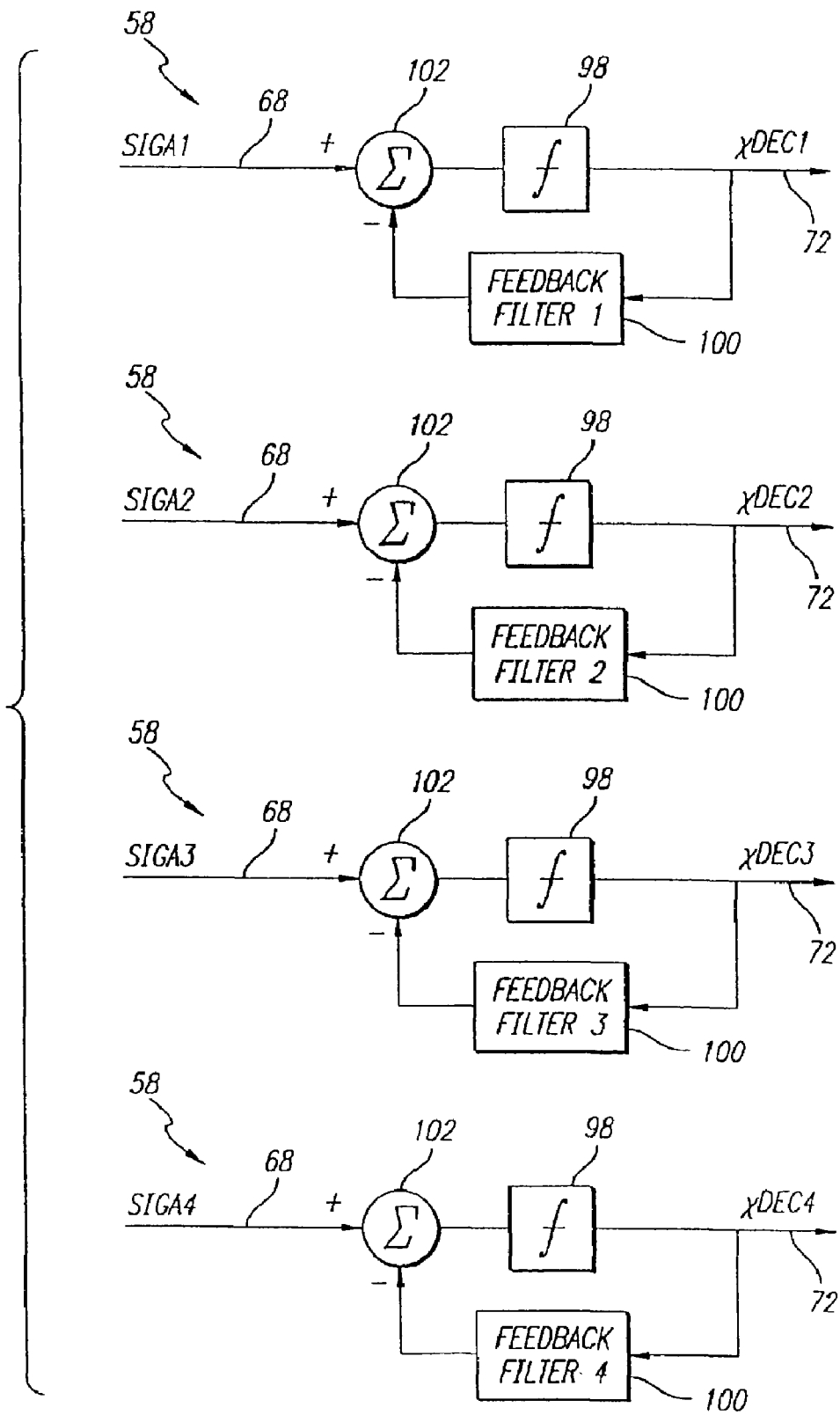
FIG. 7 is a schematic block diagram of a symbol-by-symbol detector of FIG. 6, each including a plurality of slicers, feedback filters and adders and receiving as input a soft decision.

In a preferred embodiment of the invention the first detector 58 is a symbol-by-symbol detector. A group of symbol-by-symbol detectors 58, one for each channel, is shown in FIG. 7. Each first detector 58 includes a slicer 98, adaptive feedback filter 100 and an adder 102. The adder 102 combines the third soft decision 68 with the output of the adaptive feedback filter 100 to provide an output which is introduced to the slicer 98. The output of the slicer 98 in introduced to the adaptive feedback filter 100. The first detector 58 provides an output signal 72 which corresponds to the discrete level from the set [−2, −1, 0, 1, 2] which is closest to the difference between the third soft decision 68 and the output of the feedback filter 100. The adaptive feedback filter 100 corrects for distortion in the third soft decision 68. This filter 100 uses past slicer 98 decisions to estimate postcursor ISI caused by the channel. This ISI is canceled from the third soft decision 68 to form the final decision signal 72.

In another embodiment of the invention the first detector 58 is a combination of a sequential decoder with a decision feedback equalizer (DFE) using the architecture usually known as multiple DFE architecture (MDFE) sequential detector. The sequential decoder 58 looks at all signals from all four channels at the same time and at successive samples from each channel over several periods of unit time. A sequential decoder receives as input at least one signal from each of the first devices 56. The sequential decoder 58, in general, is responsive to the sequences of the output signals from the first devices 56 for (1) passing acceptable sequences of such signals and (2) discarding unacceptable sequences of such signals in accordance with the constraints established by the code standard associated with the system. Acceptable sequences are those which obey the code constraints and unacceptable sequences are those which violate the code constraints.

The second detector 60 (FIG. 6) receives the first soft decision 52 from the second device 50. The second detector 60 is a symbol-by-symbol detector. It provides an output signal 74 which corresponds to the discrete level from the set [−2, −1, 0, 1, 2] which is closest to the difference between the first soft decision 52 and the output of the feedback filter 100. The second detector 60 produces output signals 74 without the benefit of FEXT cancellation, as a result, these decisions have a higher error rate than those made by the first detector 58, which enjoys the benefits of FEXT cancellation. Because of this fact, these decisions are called "tentative decisions". It is important to note that the postcursor ISI present in the input to the second detector 60 is canceled using the auxiliary feedback filter 100, (FIG. 7) contained within the second detector, whose inputs are the tentative decisions 74. The coefficients of this adaptive feedback filter 100 are the same as those of the adaptive feedback filter associated with the first detector 58 (FIG. 6).

A third device 62, typically a summing device, receives the first soft decision signal 52 from the second device 50 and the tentative decision signals 74 from the second detector 60. At the third device 62 the first soft decision 52 is combined with the tentative decision signal 74 to produce an error signal 76 which is introduced into the timing recovery circuit 64. The timing recovery circuit 64 receives the tentative decision 74 from the second detector 60 and the error signals 76 from the third device 62. Using these signals as inputs the timing recovery circuit 64 outputs an analog clock sync signal 78 which is introduced to the A/D converter 42 and a digital clock sync signal 80 which is introduced into the FIFO 44. As previously mentioned, these signals control the rate at which the A/D converter 42 samples the analog input it receives from the hybrid 26 and the rate at which the FIFO forwards digital signals to the FFE 46. A suitable timing recovery device for use in the present invention is disclosed in copending patent application Ser. No. 08/970,557 entitled APPARATUS FOR, AND METHOD OF, PROCESSING SIGNALS TRANSMITTED OVER A LOCAL AREA NETWORK and assigned of record to the assignee of record of this application.

Figure 8:
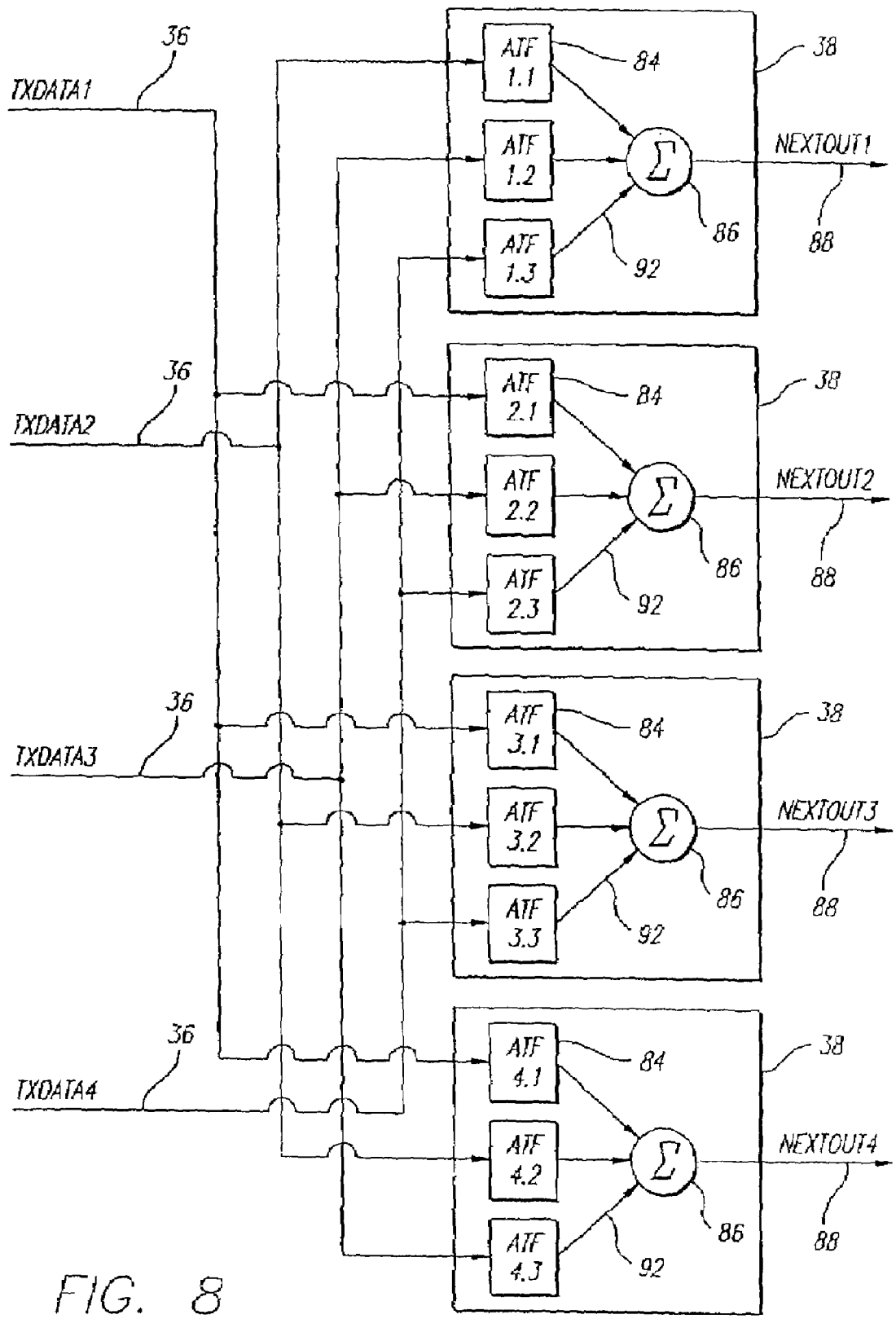
FIG. 8 is a schematic block diagram of the NEXT cancellation systems of FIG. 6, each including a plurality of adaptive transversal filters (ATF) and adders and receiving as input transmitted signals from adjacent transmitters.

As mentioned before, the symbols sent by the transmitters 22 (FIG. 2) in the communications system cause NEXT, echo and FEXT impairments in the received signal for each channel. Since each receiver 24 has access to the data for the other three channels that cause this interference, it is possible to nearly cancel each of these effects. NEXT cancellation is accomplished using three adaptive NEXT cancelling filters as shown in the block diagram of FIG. 8. Each NEXT cancellation system 38 receives three TXDatax symbols 36 from each of the transmitters at the same end of the communications line 18 as the receiver with which the NEXT cancellation system is associated. Each NEXT cancellation system 38 includes three filters 84, one for each of the TXDatax symbols 36.

These filters 84 model the impulse responses of the NEXT noise from the transmitters and may be implemented as adaptive transversal filters (ATF) employing, for example, the LMS algorithm. The filters 84 produce a replica of the NEXT impairment signal for each TXDatax symbol 36. A summing device 86 combines the three individual replica NEXT impairment signals 92 to produce a replica of the NEXT impairment signal contained within the combination signal received by the receiver with which the NEXT cancellation system 38 is associated. The replica NEXT impairment signal 88 is introduced into the second device 50 (FIG. 6) where it is combined with the combination signal 48 to produce a first soft decision signal 52 which is substantially devoid of NEXT impairment signals.

Figure 9:
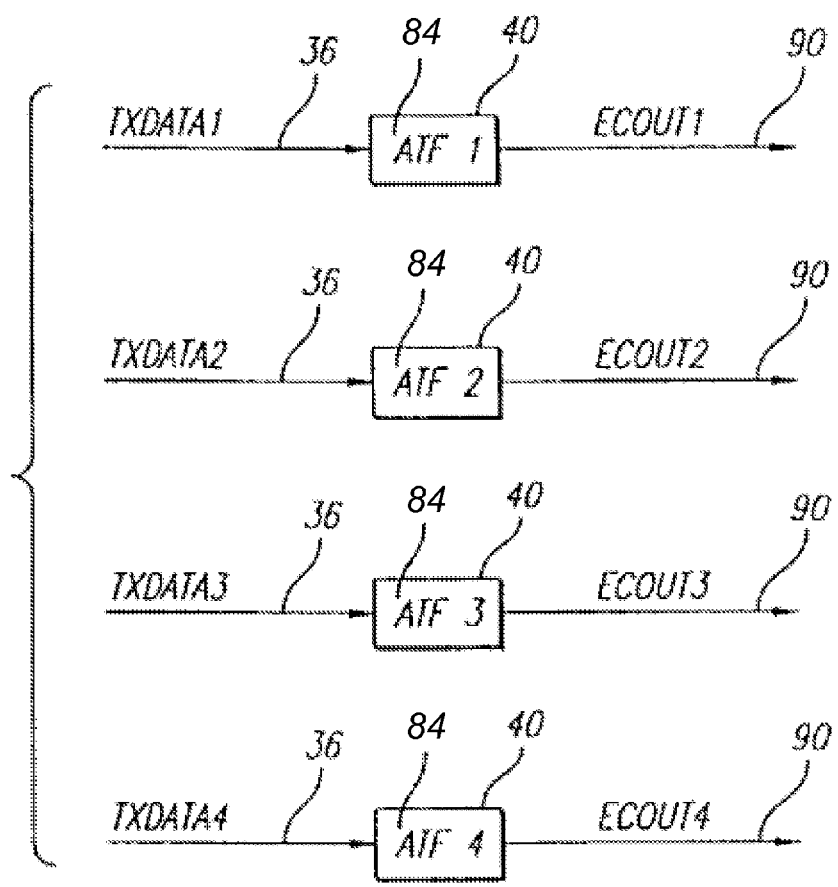
FIG. 9 is a schematic block diagram of the echo cancellers of FIG. 6, each including an ATF and receiving as input transmitted signals from the same transmitters.

Echo cancellation is accomplished with an adaptive cancelling filter 84 as shown in the block diagram of FIG. 9. Each echo canceller 40 receives the TXDatax symbols 36 from the transmitter at the same end of the twisted wire pair 18 as that of the receiver with which the echo canceller is associated. As shown in FIG. 9, each echo canceller 40 includes one filter 84. These filter 84 model the impulse responses of the echo noise from the transmitter and may be implemented as ATFs employing, for example, the LMS algorithm. The filter produces a replica of the echo impairment signal contained within the combination signal received by the receiver with which the echo canceller 40 is associated. The replica echo impairment signal 90 is introduced into the second device 50 (FIG. 6) where it is combined with the combination signal 48 to produce the first soft decision signal 52 which is substantially devoid of echo impairment signals.

Figure 10:
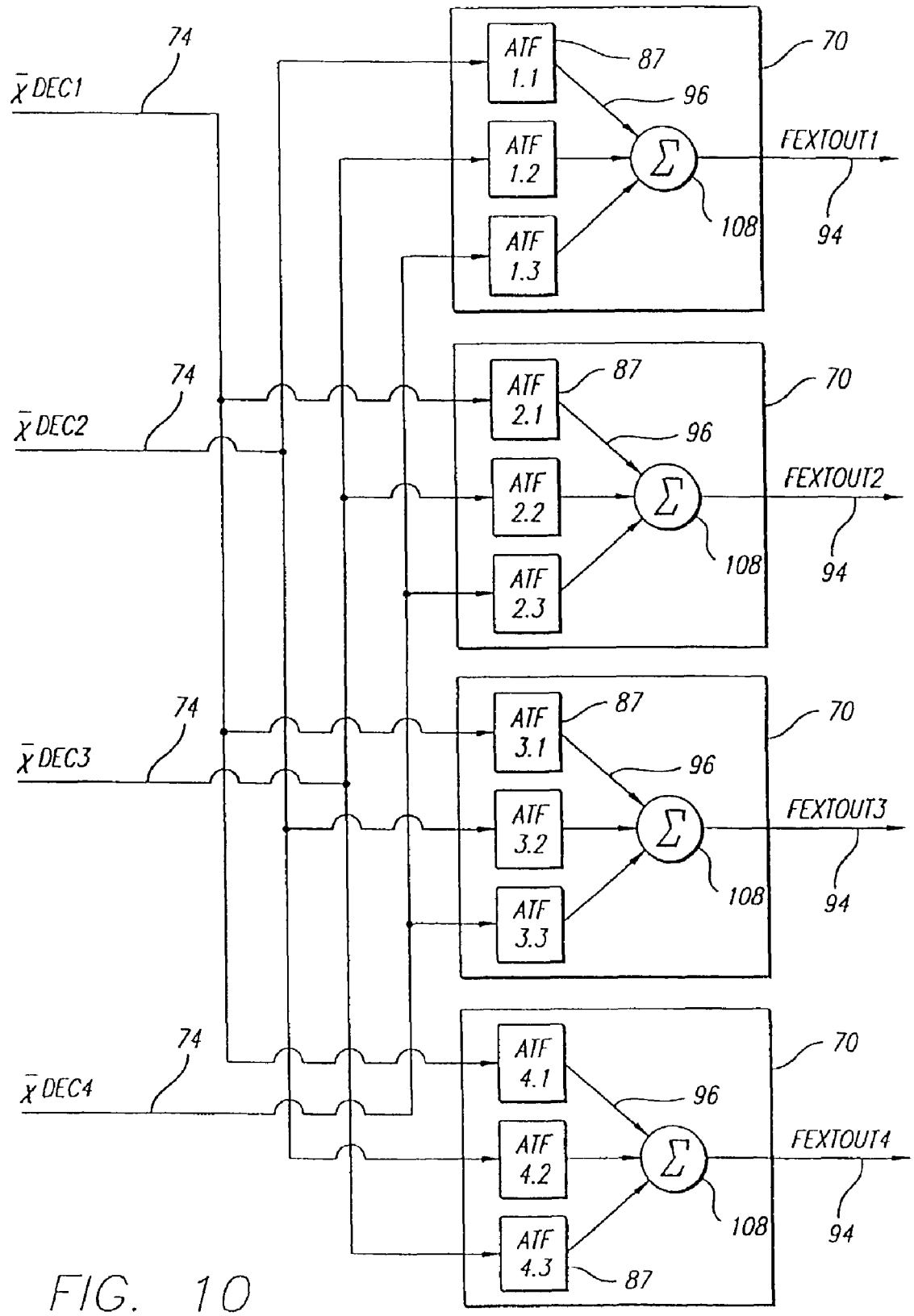
FIG. 10 is a schematic block diagram of the FEXT cancellation systems of FIG. 6, each including a plurality of ATFs and an adder and receiving as input transmitted signals from opposite transmitters.

FEXT cancellation is accomplished with three adaptive FEXT cancelling filter 87 is shown in the block diagram of FIG. 10. Each FEXT cancellation system 70 receives three tentative decision symbols 74 one from each of the receivers at the same end of the communications line as the receiver with which the FEXT cancellation system is associated. Each FEXT cancellation system 70 includes three filters 87, one for each, of the tentative decision symbols 74. These filters 87 model the impulse responses of the FEXT noise from transmitters and may be implemented as ATFs employing, for example, the LMS algorithm. The filters 87 produce a replica of the FEXT impairment signal 96 for each individual tentative decision symbol 74. A summing device 108 combines the three individual replica FEXT impairment signals 96 to produce a replica of the FEXT impairment signal contained within the combination signal 48 received by the receiver with which the FEXT cancellation system is associated. The replica FEXT impairment signal 94 is introduced into the first device 56 (FIG. 6) where it is combined with the second combination signal 66 to produce the third soft decision signal 68 which is substantially devoid of FEXT impairment signals. It is important to note that the higher error rate of the tentative decisions 74 does not degrade the performance of the FEXT cancellation system 70, because the decisions used to cancel FEXT are statistically independent from the final decisions 72 made by the receiver whose FEXT is being canceled.

The symbols provided by the first detector 58 are decoded and descrambled by the receive section of the PCS 30 before being introduced to the GMII. Variations in the way the wire pairs are twisted may cause delays through the four channels by up to 50 nanoseconds. As a result, the symbols across the four channels may be out of sync. As previously mentioned, in the case where the first detector is a sequential detector, the PCS also determines the relative skew of the four streams of 1-D symbols and adjusts the symbol delay, through the skew adjuster 54, prior to their arrival at the first detector 58 so that sequential decoder can operate on properly composed four-dimensional (4-D) symbols. Additionally, since the cabling plant may introduce wire swaps within a pair and pair swaps among the four unshielded twisted pairs, the PCS 30 also determines and corrects for these conditions.

Figure 5:
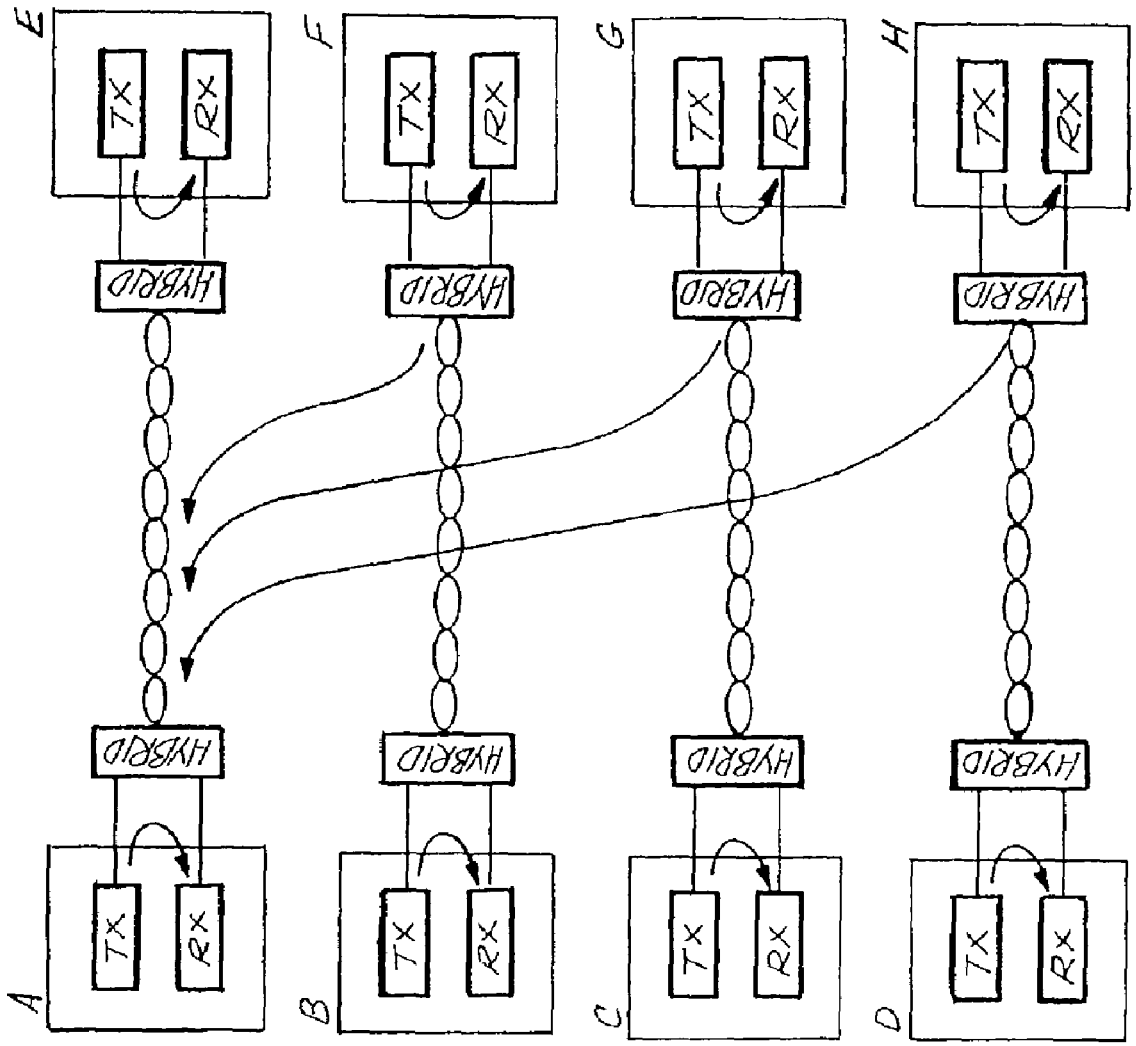
FIG. 5 is a schematic block diagram of a portion of the communications system of FIG. 2 depicting the FEXT impairment signals received by receiver A from opposite transmitters F, G, and H.

As previously mentioned, FEXT is an impairment that results from capacitive coupling of the signal from the far-end transmitters to the input of the receivers, as shown in FIG. 5. The crosstalk signals from transmitters F, G, and H appear as noise to receiver A, which is attempting to detect the signal from transmitter E, A similar situation applies to all other receivers regarding the signals from the appropriate transmitters located at the opposite end of the line.

The FEXT noise experienced by receiver A and originating from transmitter F can be modeled as the convolution of the data symbols transmitted by F with a certain impulse response that depends on the properties of the cable and models the coupling characteristics of the unshielded twisted pairs used by transmitter F and receiver A. A typical measured FEXT impulse response 104 is show in FIGS. 11-13. A similar description can be given for all the other possible receiver-transmitter combinations. Therefore, there are a total of twelve FEXT impulse responses 104 describing the FEXT noise signals from transmitters E, F, G, and H to receivers A, B, C, and D. These twelve impulse responses are not identical, although each has a general shape similar to that shown in FIGS. 11-13.

Although FEXT is an impairment for many communications systems other than Gigabit Ethernet, in these systems a given receiver usually does not have access to the symbols detected by the other receivers, because these receivers may not be physically located in the same place, and/or because they operate at rates that are not synchronized to the data rate of the receiver suffering from FEXT. The present invention takes advantage of the fact that in Gigabit Ethernet transceivers the decisions that correspond to all four channels are available to the four receivers and the decisions may be made synchronous.

Figure 11:
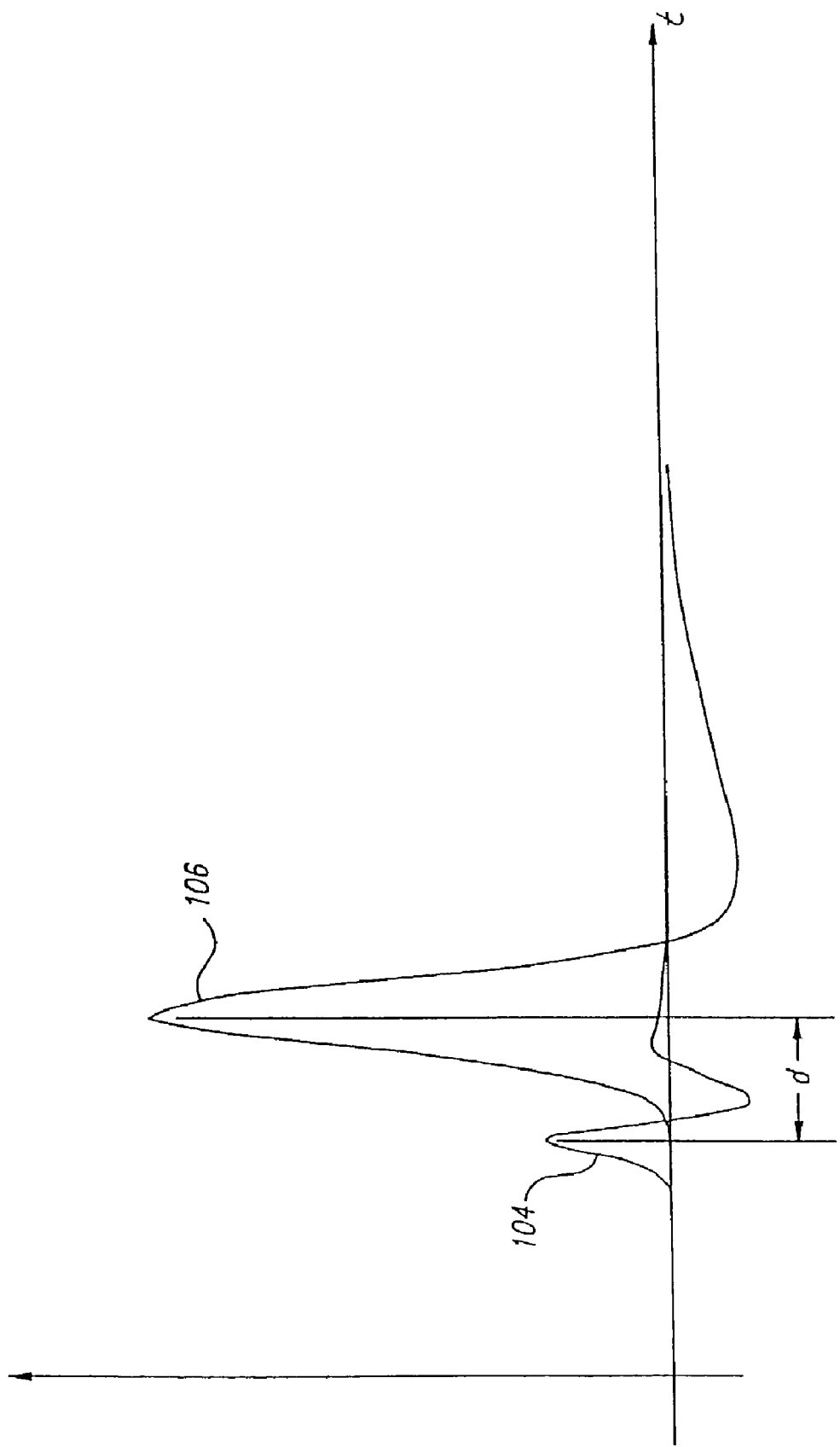
FIG. 11 depicts a direct impulse response arriving at the receiver after a FEXT impulse response.

In operation there may be delays associated with the transmission of signals across the communications line. The synchronization of the signals within the system is crucial to effective cancellation of the noise. It is important that the replica noise impairment signals arrive at the summing devices at substantially the same time as the combination signal and/or soft decision signals. With regard to the FEXT impairment signal, because the impairment is caused by the transmitters at the opposite end of the receiver there is likely to be a delay between the time that the second soft decision signal 66 arrives at the first device 56 and the time at which the replica FEXT impairment signal 94 arrives. In some channels, as illustrated in FIG. 11, the group delay of the FEXT signal 104 could be smaller than the group delay of the desired signal 106. In this ease the tentative decisions 74 provided by receivers B, C, and D of FIG. 5 arrive at the FEXT cancellation system 70 of receiver A too late to be effective in canceling the FEXT impairment.

To compensate for this delay, the invention employs a skew adjuster 54 which, as previously stated, delays the first soft decision signal 52 by a time substantially equal to or greater than the time delay between the arrival at the receiver of the direct signal and the FEXT impairment signals associated with such receiver. If the output is delayed by an amount greater than the time delay, which would result in the situation illustrated in FIG. 13, the adaptive feedback filter 84 (FIG. 10) within the FEXT cancellation system 70 compensates for the over delay by delaying the replica FEXT impairment signal 94 so that it arrives at the first device 56 (FIG. 6) at substantially the same time as the second soft decision signal 66.

The third soft decision 68 resulting from FEXT cancellation allows the first detector 58 to make more reliable final decisions 72, with a greatly reduced error rate. Computer simulations show that a typical improvement achievable with the invention described herein is approximately 2 to 3 dB when the signal to noise ratio at the input of the first detector 58 before FEXT cancellation is approximately 25 dB. This corresponds to a reduction of the symbol error rate of a factor 1000 or larger.

Figure 12:
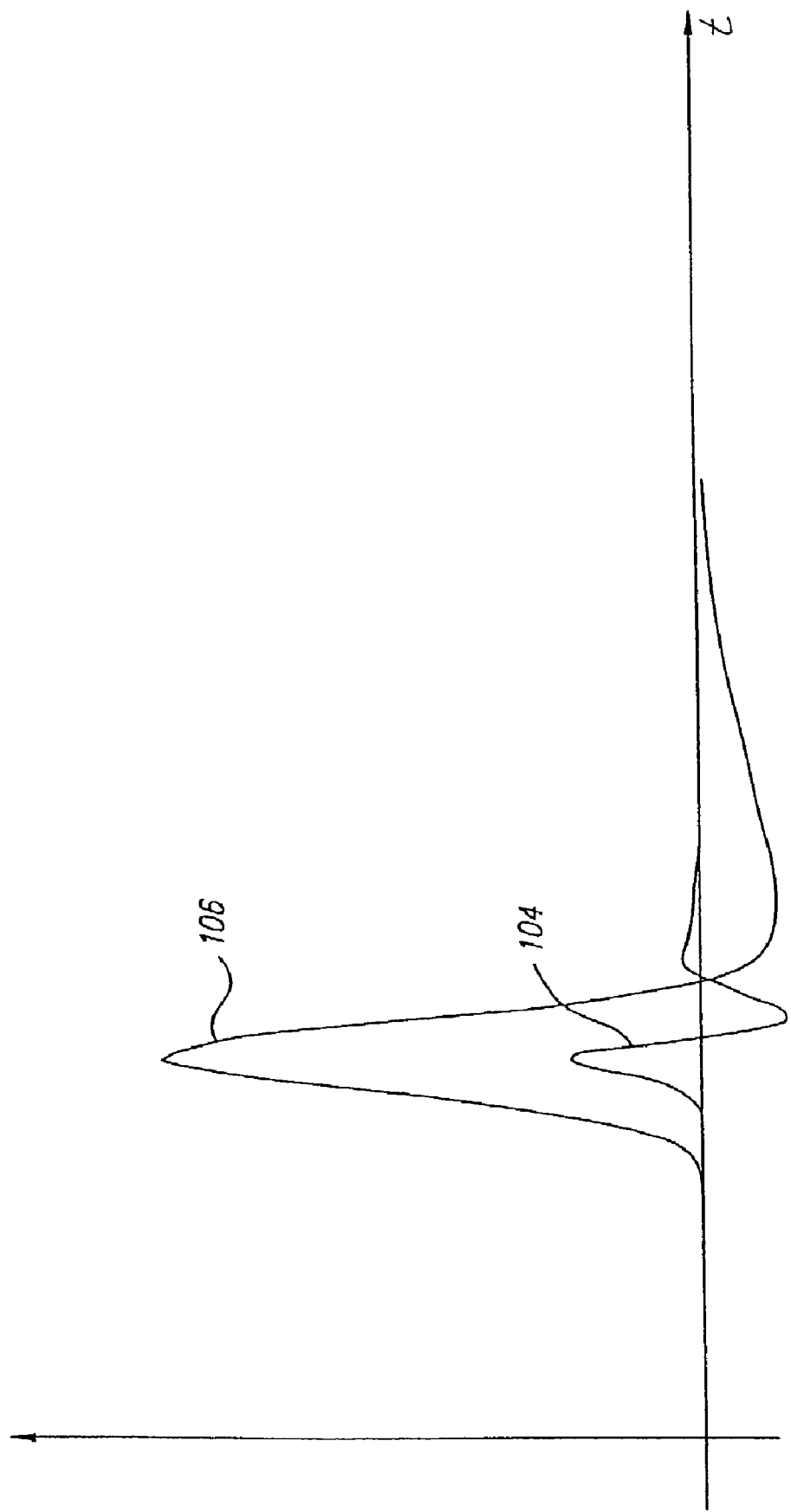
FIG. 12 depicts a direct impulse response and FEXT impulse response arriving at the receiver at substantially the same time.
Figure 13:
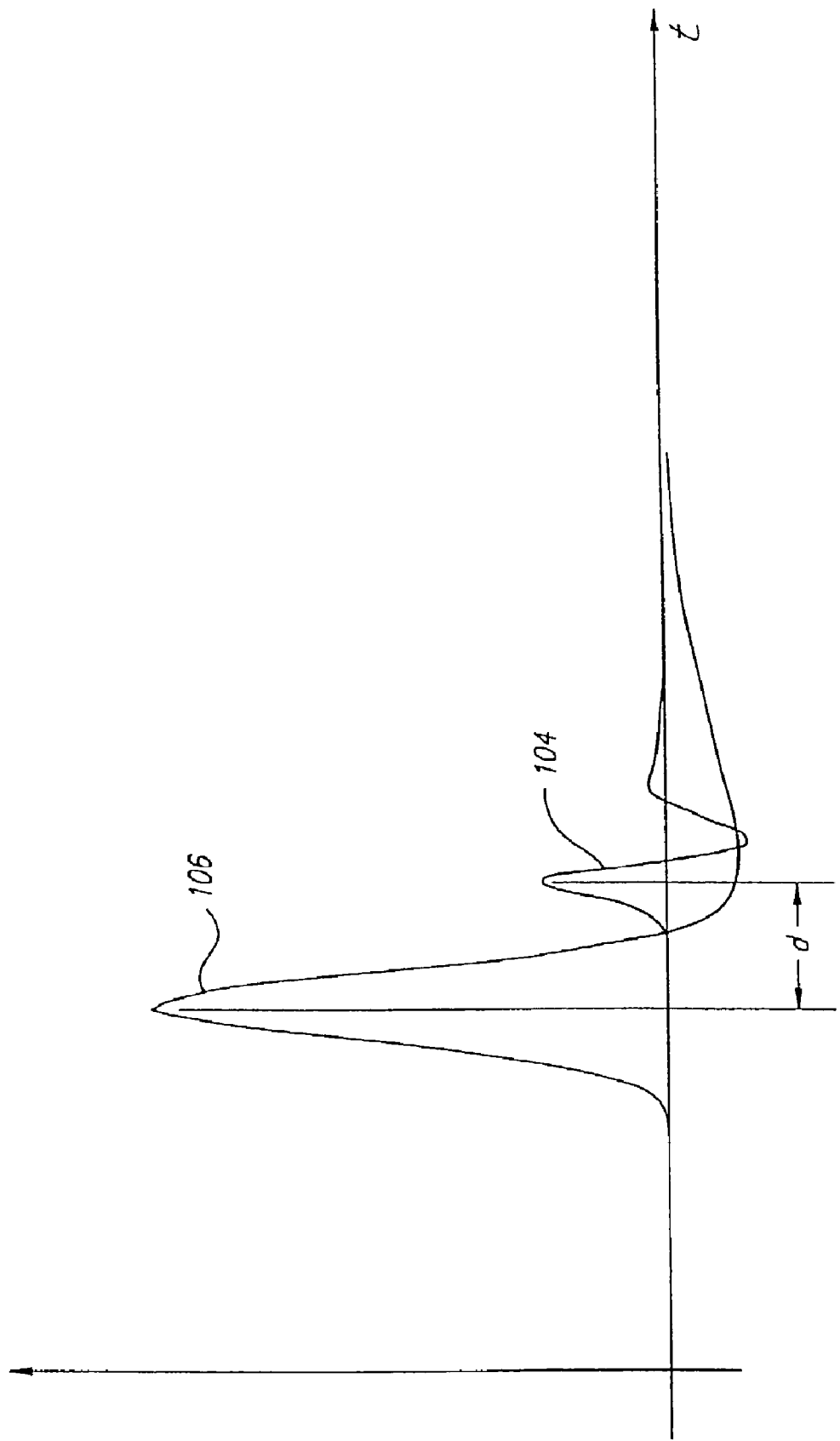
FIG. 13 depicts a direct impulse response arriving at the receiver before a FEXT impulse response.

If there is no delay associated with the transmission of signals across the communications line both the FEXT impairment signal 104 and the direct signal 106 arrive at the receiver at the substantially the same time, as shown in FIG. 12. In this situation, the delay of the skew adjuster 54 is set to zero. In the alternative, an embodiment of the invention, as shown in FIG. 14, with only one detector 110 and one summing device 112 may be used. In this configuration, the summing device 112 receives the replica NEXT, echo, and FEXT impairment signals 88, 90, 94 and the combination signal 48 and produces a first soft decision 52 substantially devoid of impairment signals. This first soft decision 52 is introduced into the detector 110 and the third device 62. The detector 110 may include either a single symbol-by-symbol detector or both a symbol-by-symbol detector and a sequential detector. In the case of a symbol-by-symbol detector the final decision 72 and second output 114 of the detector 110 are identical. In the case of both a symbol-by-symbol detector and a sequential detector, the final output is provided by the sequential detector and is introduced to the PCS 30. The second output 114 is provided by the symbol-by-symbol detector and is introduced to the timing recovery circuitry 64 and the third device 62 for use in determining the error signal 76.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

The invention claimed is:

1. A communication system comprising:
a plurality of far-end crosstalk (FEXT) mitigation systems, each generating a replica FEXT signal; and
at least one device that generates, based on at least one of the replica FEXT signals and at least one first signal, at least one second signal that is substantially devoid of FEXT signals.

2. The system of claim 1 wherein the at least one device comprises at least one detector.

3. The system of claim 1 wherein the at least one first signal comprises a direct signal and at least one FEXT signal.

4. The system of claim 3 wherein the at least one second signal comprises one of a tentative decision and a soft decision.

5. The system of claim 1 wherein the at least one first signal comprises a combination signal.

6. The system of claim 5 wherein each combination signal comprises one of a tentative decision and a soft decision.

7. The system of claim 1 wherein the communication system is a wired transceiver.

8. The system of claim 7 wherein the transceiver is an Ethernet transceiver.

9. The system of claim 8 wherein the transceiver is a gigabit Ethernet transceiver.

10. A communication system comprising:
a first far-end crosstalk (FEXT) mitigation system that generates a first replica FEXT signal;
a second FEXT mitigation system that generates a second replica FEXT signal;
at least one device that generates a first signal based on the first replica FEXT signal and a second signal, and that generates a third signal based on the second replica FEXT signal and a fourth signal, wherein the first and third signals are substantially devoid of FEXT signals.

11. The system of claim 10 wherein the at least one device comprises at least one detector.

12. The system of claim 10 wherein each of the second and fourth signals comprise a direct signal and at least one FEXT signal.

13. The system of claim 12 wherein each of the second and fourth signals comprises one of a tentative decision and a soft decision.

14. The system of claim 10 wherein each of the second and fourth signals comprises a combination signal.

15. The system of claim 14 wherein each of the combination signals comprises one of a tentative decision and a soft decision.

16. The system of claim 10 wherein the communication system is a wired communication system.

17. The system of claim 16 wherein the communication system is an Ethernet communication system.

18. The system of claim 17 wherein the communication system is a gigabit Ethernet communication system.

19. A method of reducing noise in a communication system comprising:
receiving a first signal comprising a far-end crosstalk (FEXT) impairment signal;
generating a replica FEXT signal; and
generating a second signal by combining the replica FEXT signal with the first signal, the second signal being substantially devoid of the FEXT signal.

20. The method of claim 19 wherein generating the replica FEXT signal is based on a tentative decision.

21. The method of claim 19 wherein generating the replica FEXT signal is based on a combination signal.

22. The method of claim 21 wherein the combination signal comprises a tentative decision.

23. The method of claim 19 wherein the second signal comprises a soft decision.

24. The method of claim 19 wherein the first signal comprises a soft decision.

25. The method of claim 19 wherein generating a replica FEXT signal comprises:
generating a plurality of individual replica FEXT signals; and
combining the plurality of individual replica FEXT signals.

26. The method of claim 19 wherein the first signal is received in a first channel of the communication system, and wherein generating the replica FEXT signal is based on a plurality of individual signals received, each in a respective one of a plurality of other channels of the communication system.

27. The method of claim 19 wherein the communication system is a wired communication system.

28. The method of claim 27 wherein the communication system is an Ethernet communication system.

29. The method of claim 28 wherein the communication system is a gigabit Ethernet communication system.

30. A communication system comprising:
- a far-end crosstalk (FEXT) mitigation system that generates a replica FEXT signal; and
- a device that receives a first signal comprising a FEXT signal, and that generates, using the first signal and the replica FEXT signal, a second signal that is substantially devoid of the FEXT signal.

31. The system of claim 30 wherein the device generates the second signal by combining the replica FEXT signal and the first signal.

32. The system of claim 30 wherein the FEXT mitigation system generates a plurality of individual replica FEXT impairment signals, and combines the plurality of individual replica FEXT impairment signals to generate the replica FEXT impairment signal.

33. The system of claim 30 wherein the second signal comprises a soft decision.

34. The system of claim 30 wherein the first signal comprises a combination signal.

35. The system of claim 34 wherein the combination signal comprises a soft decision.

36. The system of claim 30 wherein the system is a wired communication system.

37. The system of claim 36 wherein the system is an Ethernet communication system.

38. The system of claim 37 wherein the system is a gigabit Ethernet communication system.

39. A communication transceiver comprising:
- a far-end crosstalk (FEXT) mitigation device operable to produce an estimate of a FEXT component present in a received signal; and
- a combining device operable to subtract the estimated FEXT component from the received signal.

40. The transceiver of claim 39 wherein the combining device comprises an adder.

41. The transceiver of claim 39 wherein the received signal comprises a direct signal and a FEXT signal component.

42. The transceiver of claim 39 wherein the FEXT mitigation device produces the estimate of the FEXT component present in the received signal based on a tentative decision regarding a characterization of the received signal.

43. The transceiver of claim 39 wherein the received signal comprises a combination signal.

44. The transceiver of claim 39 wherein the combining device is operable to subtract the estimated FEXT component from a soft decision regarding a characterization of the received signal.

45. The transceiver of claim 39 wherein the FEXT mitigation system produces a plurality of estimates of individual FEXT components present in the received signal, and combines the estimates of the individual FEXT components to generate the estimate of the FEXT component present in the received signal.

46. The transceiver of claim 39 wherein the transceiver is a wired transceiver.

47. The transceiver of claim 39 wherein the transceiver is an Ethernet transceiver.

48. The transceiver of claim 39 wherein the transceiver is a gigabit Ethernet transceiver.

* * * * *